US006470566B2

(12) United States Patent
Hsiao et al.

(10) Patent No.: US 6,470,566 B2
(45) Date of Patent: Oct. 29, 2002

(54) ESD PROTECTION DURING GMR HEAD FABRICATION

(75) Inventors: Richard Hsiao, San Jose, CA (US); Edward Hin Pong Lee, San Jose, CA (US); Timothy J. Moran, San Jose, CA (US); Joseph Francis Smyth, Aptos, CA (US); Howard Gordon Zolla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 09/754,139

(22) Filed: Jan. 3, 2001

(65) Prior Publication Data

US 2002/0083576 A1 Jul. 4, 2002

(51) Int. Cl.[7] .............................................. G11B 5/127
(52) U.S. Cl. ................................ 29/603.13; 29/603.07; 360/323
(58) Field of Search ....................... 29/603.07, 603.13; 360/323

(56) References Cited

U.S. PATENT DOCUMENTS

| | | | |
|---|---|---|---|
| 4,802,043 A | 1/1989 | Sato et al. ................... 360/113 |
| 4,931,892 A | 6/1990 | Spada ......................... 360/113 |
| 5,272,582 A | * 12/1993 | Shibata et al. .............. 360/323 |
| 5,375,022 A | 12/1994 | Gill et al. .................... 360/113 |
| 5,465,186 A | 11/1995 | Bajorek et al. ............. 360/113 |
| 5,491,605 A | 2/1996 | Hughbanks et al. ........ 360/113 |
| 5,539,598 A | 7/1996 | Denison et al. ............. 360/113 |
| 5,557,492 A | 9/1996 | Gill et al. .................... 360/113 |
| 5,757,590 A | 5/1998 | Phipps et al. ............... 360/113 |
| 5,757,591 A | 5/1998 | Carr et al. ................... 360/113 |
| 5,761,009 A | 6/1998 | Hughbanks et al. ........ 360/113 |
| 5,805,390 A | 9/1998 | Takeura ...................... 360/113 |
| 5,859,753 A | 1/1999 | Ohtsuka et al. ............. 360/113 |
| 5,978,181 A | 11/1999 | Niijima et al. .............. 360/113 |

FOREIGN PATENT DOCUMENTS

| | | |
|---|---|---|
| EP | 0 457 278 A2 | 11/1991 |
| JP | 361096508 A | 5/1986 |
| JP | 406111250 A | 4/1994 |
| JP | 406243434 A | 9/1994 |
| JP | 407073419 A | 3/1995 |
| JP | 408045033 A | 2/1996 |
| JP | 410055518 A | 2/1998 |
| JP | 11175931 | 2/1999 |

* cited by examiner

Primary Examiner—P. W. Echole
(74) Attorney, Agent, or Firm—Robert O. Guillot; IPLO Intellectual Property Law Offices

(57) ABSTRACT

To protect the MR read head element from ESD damage during wafer level manufacturing, a lead from the MR element is electrically connected to one or both of the read head element shields during manufacturing. In a preferred embodiment of the present invention, the electrical connection is fabricated in the kerf area between adjacent magnetic heads as they are fabricated upon a wafer substrate. Thereafter, when the magnetic heads are separated by saw cutting through the kerf areas, the electrical connections are thereby removed, such that the MR element electrical leads and the shields are electrically isolated. In an alternative embodiment, one or more of the shields, as well as the MR element leads can also be electrically connected to the substrate upon which the magnetic head is fabricated. In further alternative embodiments, the electrical connection between one or more of the shields and the MR element electrical lead can be fabricated within the magnetic head area, rather than in the kerf area, and a suitable resistance is fabricated into the interconnecting circuit. In this embodiment, the electrical interconnection between the MR element electrical lead and one or more of the shields has a pre-designed electrical resistance and it remains in the magnetic head following fabrication.

20 Claims, 4 Drawing Sheets

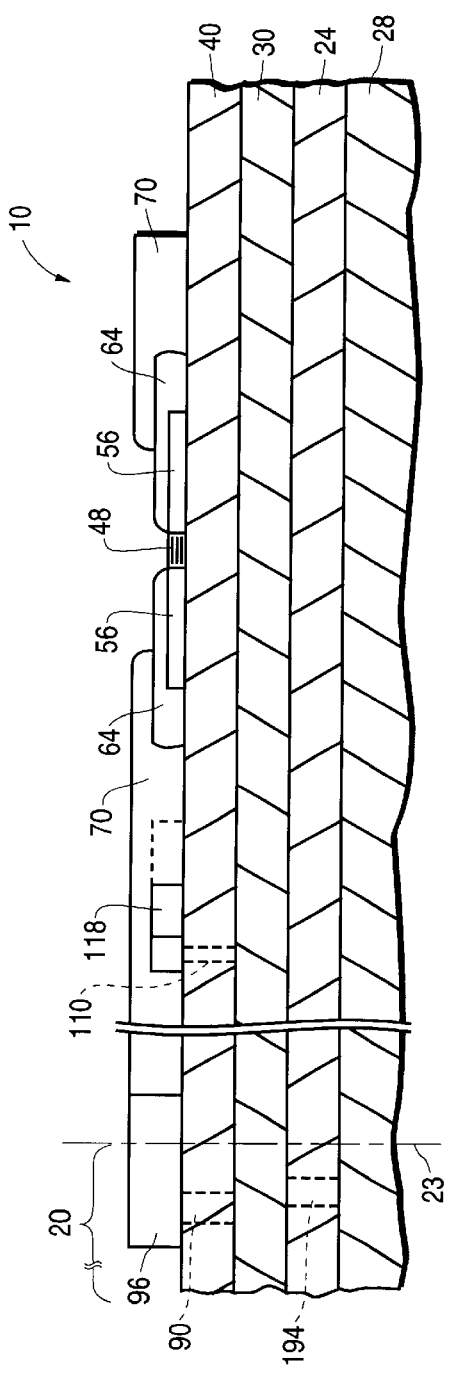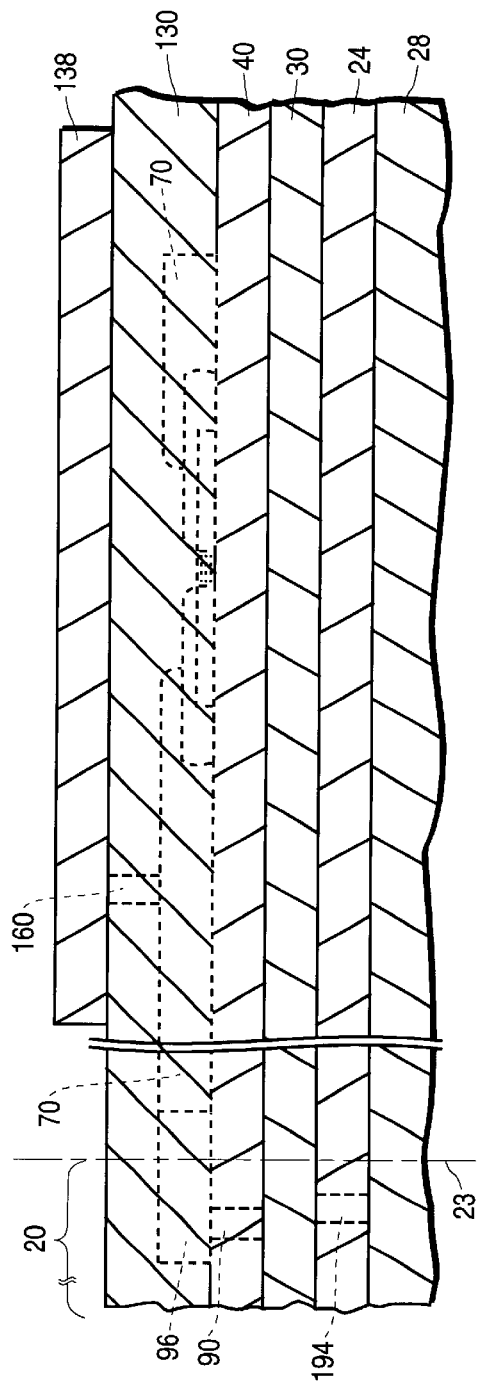

ESD PROTECTION DURING GMR HEAD FABRICATION

BACKGROUND OF THE INVENTION

1. Field of the Invention

The present invention relates generally to methods for fabricating magnetic heads for hard disk drives, and more particularly to devices and methods for preventing electrostatic discharge (ESD) damage to magnetoresistive read head elements during the manufacturing of such magnetic heads.

2. Description of the Prior Art

Thin film heads are particularly susceptible to damage from electrostatic discharge. A major problem that is encountered during manufacture, handling and use of magnetic recording heads is the buildup of electrostatic charges on the various elements of a head or other objects which come into contact with the heads and the accompanying spurious discharge of the static electricity thus generated. For example, static charges may be produced at various steps during wafer processing. The build up of the static charge can cause the breakdown of the read gaps, leading to the shorting of the read sensor to its adjacent shields or the damage of the sensor itself.

Magnetoresistive (MR) sensors are well known and are particularly useful as read elements in magnetic heads, especially at high recording densities. The MR read sensor provides a higher output signal than other types of read heads. This higher output signal results in a higher signal to noise ratio for the recording channel, and thus allows greater areal density of recorded data on a magnetic disk surface to be achieved. As described above, when an MR sensor is exposed to ESD, or even a voltage or current input larger than that intended under normal operating conditions, referred to as electrical overstress or EOS, the MR read sensor and other parts of the head may be damaged. This sensitivity to electrical damage is particularly severe for MR read sensors because of these sensors' relatively small physical size. For example, an MR sensor used for extremely high recording densities will have an area of approximately 0.5 by 0.3 microns or smaller. The nature of the damage which may be experienced by an MR sensor varies significantly, including complete destruction of the sensor via melting and evaporation, contamination of the air bearing surface, generation of shorts via electrical breakdown, and milder forms of damage in which the head performance may be degraded. These types of damages have been found to occur during both processing and use and poses a serious problem in the manufacturing and handling of magnetic heads incorporating MR read sensors.

SUMMARY OF THE INVENTION

To protect the MR read head element from ESD damage during wafer level manufacturing, a lead from the MR element is electrically connected to one or both of the read head element shields during manufacturing. In a preferred embodiment of the present invention, the electrical connection is fabricated in the kerf area between adjacent magnetic heads as they are fabricated upon a wafer substrate. Thereafter, when the magnetic heads are separated by saw cutting through the kerf areas, the electrical connections are thereby removed, such that the MR element electrical leads and the shields are electrically isolated. In an alternative embodiment, one or more of the shields, as well as the MR element leads can also be electrically connected to the substrate upon which the magnetic head is fabricated. In further alternative embodiments, the electrical connection between one or more of the shields and the MR element electrical lead can be fabricated within the magnetic head area, rather than in the kerf area, and a suitable resistance is fabricated into the interconnecting circuit. In this embodiment, the electrical interconnection between the MR element electrical lead and one or more of the shields has a pre-designed electrical resistance and it remains in the magnetic head following fabrication.

It is an advantage of the present invention that electrostatic damage to the MR element is minimized during manufacturing.

It is another advantage of the present invention that the electrical connection between the MR element electrical leads and one or more of the shields is fabricated by altering one or more of the masks that are utilized in fabricating the magnetic head.

It is a further advantage of the present invention that the electrical connection between the MR element electrical lead and one or more of the shields is severed following manufacturing by the magnetic head separation process, such that no additional manufacturing step is required to sever the electrical connection.

These and other features and advantages of the present invention will no doubt become apparent to those skilled in the art upon reading the following detailed description which makes reference to the several figures of the drawing.

IN THE DRAWINGS

FIG. 2 is a cross-sectional view, generally depicting the fabrication stage of a magnetic head depicted in FIG. 1;

FIG. 4 is a cross-sectional view, generally depicting the fabrication stage of a magnetic head depicted in FIG. 3;

As is well known to those skilled in the art, a plurality of magnetic heads are fabricated upon a wafer substrate surface utilizing thin film deposition techniques, photolithographic techniques and/or ion beam deposition and material removal techniques. Such magnetic heads typically include a read head portion that is designed to read magnetic information from a magnetic hard disk, and a write head portion that is designed to write information to a magnetic hard disk. Typically, the read head is first fabricated upon the disk substrate and the write head is subsequently fabricated upon the read head. The present invention seeks to prevent ESD damage to the MR read head element during the manufacturing process by electrically connecting the sensor to its adjacent shields, as is next described in detail, commencing with the aid of FIGS. 1 and 2.

Figure 1:
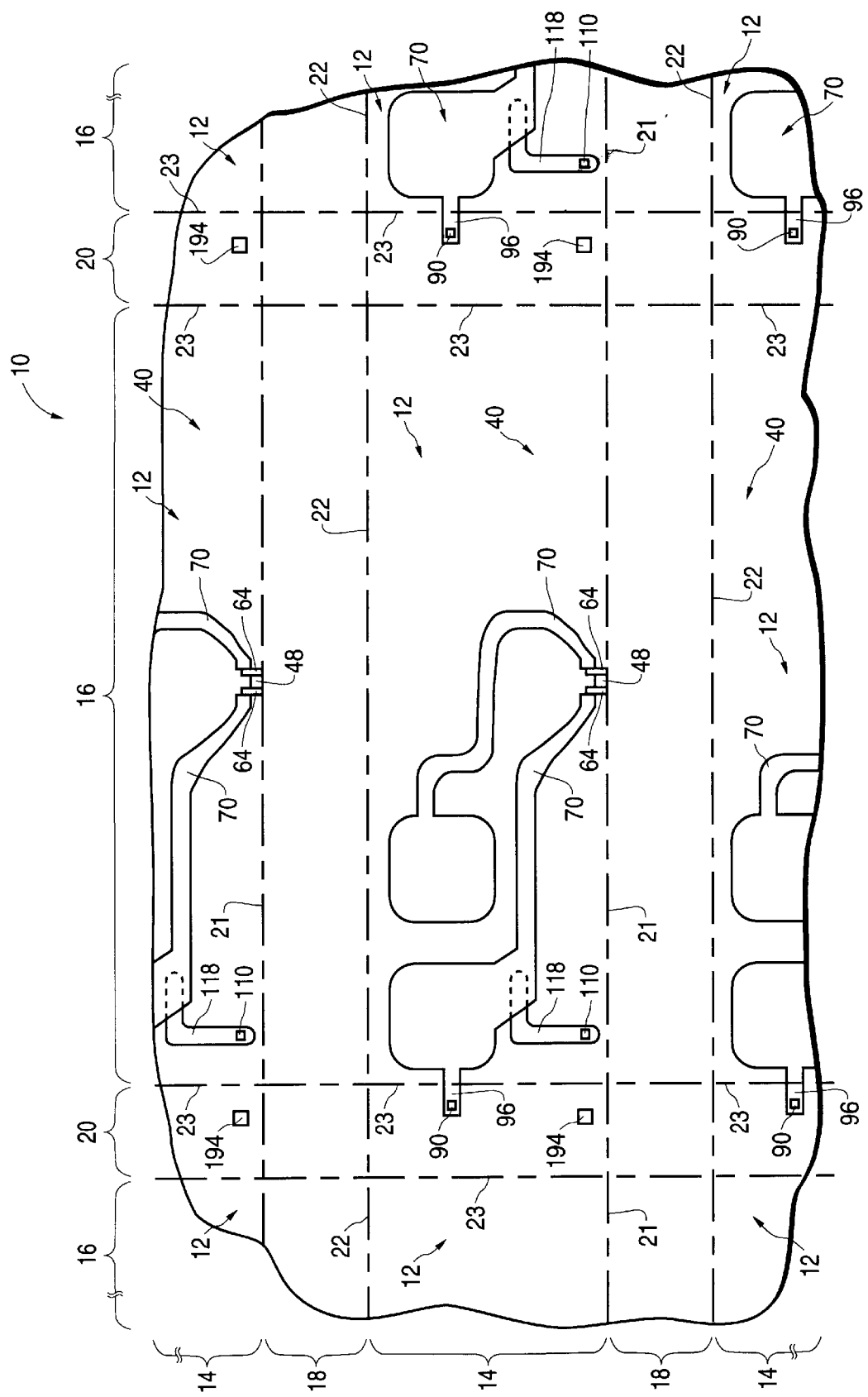
FIG. 1 is a diagrammatic top plan view, generally depicting a process stage of a plurality of magnetic heads being fabricated upon a wafer substrate.

FIG. 1 is a generalized top plan view of a wafer substrate 10 having a plurality of magnetic heads 12 disposed thereon, taken during a point in the magnetic head fabrication process wherein the read head element is being fabricated and the write head element has not yet been fabricated. FIG. 2 is a side cross-sectional view depicting a magnetic head of FIG. 1. As depicted in FIG. 1 a plurality of magnetic heads 12 of the present invention are being fabricated upon the surface of a wafer substrate 10. The magnetic heads 12 are arranged in rows 14 and columns 16 upon the wafer surface. The magnetic heads are designed to be separated from each other following manufacturing, whereby horizontal saw cut areas or kerf areas 18 are formed between the horizontal rows 14 of heads, and vertical kerf areas 20 are formed between the vertical columns 16 of heads. It is thus to be understood that saw cutting in the kerf areas following manufacturing will separate the plurality of magnetic heads 12. Following the head separation step each head 12 will have an air bearing surface (ABS) side 21, a top side 22 and two lateral sides 23.

The fabrication of a magnetic head 12 of the present invention commences with the deposition of an insulation layer 24 across the surface 28 of a wafer substrate 10. Typically the wafer substrate 10 may be composed of an aluminum titanium carbide (AlTiC) composition, and the insulation layer 24 may be composed of alumina. Thereafter, a first read head shield 30, typically termed the S1 shield, is fabricated upon the insulation layer 24. In the magnetic head 12 depicted in FIGS. 1 and 2, the S1 shield 30 extends across the surface of the wafer substrate. Although, as will be understood by those skilled in the art, the S1 shield of magnetic heads need not be so large.

A second insulation layer 40 is thereafter fabricated upon the S1 shield 30 to electrically insulate it from subsequent read head structures. Following the fabrication of the insulation layer 40, a series of thin film layers are deposited upon the wafer surface to form the active magnetoresistive read head element. Many varied types of layers and structures are known to fabricate the active magnetoresistive read head element, and the present invention is intended by the inventors to generally include all such magnetoresistive elements. In the remainder of this specification, the active magnetoresistive read head element will generally referred to as an MR element 48. Following the deposition of the read head element layers across the surface of the insulation layer 40, a patterned material removal step is undertaken which results in a relatively small MR element 48 remaining on the surface of the insulation layer 40 for each magnetic head 12 that is being fabricated upon the wafer substrate 10. Thereafter, hard bias elements 56 are typically fabricated along side the MR element 48, inner electrical lead contact elements 64 are typically fabricated upon the hard bias element 56, and larger electrical leads 70 are fabricated in electrical connection with the inner leads 64. It is typical that the outer leads 70 are composed of copper and the inner leads 64 are composed of an element such as tantalum. The copper leads are normally located behind the ABS surface to avoid the corrosion of copper. Various preferred embodiments of the present invention can now be described in detail.

As has been indicated here above, it is important to prevent electrostatic discharge damage to the sensitive structures of the MR element 48, during subsequent fabrication steps that ultimately result in the completed magnetic head 12. A first embodiment of the present invention for minimizing ESD damage to the MR element 48 is the creation of an electrical connection between the MR element 48 and the S1 shield 30, and in accordance with the present invention, it is advantageous to establish this electrical connection within a kerf area 18 or 20. Therefore, as depicted in FIGS. 1 and 2, a hole or via 90 is fabricated through the gap layer 40 subsequent to the fabrication of the MR element 48 and before the fabrication of the outer electrical leads 70. The via may be formed by photolithographic and wet etch techniques, or other techniques as are known to those skilled in the art. Thereafter, the outer leads 70 are patterned to provide the metalization for the via 90 and the interconnection to the resistive lead 96. The lead 96 can be formed during the patterning of the resistive MR element 48. After the fabrication of the lead 70, an electrical connection between the S1 shield 30 and the MR element 48 through the electrical lead 70, lead 96 and via 90 is established. This electrical connection through the via 90 serves to prevent electrical isolation of the MR element 48 and the buildup of electrostatic charge that can damage the MR element 48 during manufacturing. It is significant to note that the via 90 is fabricated within the kerf area 20 of the wafer substrate 10, and that the ESD protection formed by the interconnection of the MR element 48 with the S1 shield will continue throughout the magnetic head fabrication process until the magnetic heads 12 are separated by saw cutting through the kerf area 20. The severing of the ESD protective electrical connection through the via 90 is thus achieved without the necessity of an additional magnetic head fabrication step, in that the pre-existing saw cutting step through the kerf area 20 acts to automatically sever the ESD interconnection through the removal of the via 90. Following the head separation step an edge portion of the lead 96 will be disposed at saw cut side of the head 12.

In an alternative embodiment, depicted in FIG. 1, a via 110 can be formed through the gap layer 40 to the S1 shield 30 at a location within the magnetic head 12, rather than in the kerf area, as described above. In this embodiment, the via 110 will remain as an electrical interconnection between the S1 shield 30 and the MR element 48. In such a head embodiment, where an electrical interconnection is permanently established between the S1 shield 30 and the MR element 48, it is necessary to establish an electrical path that has significant resistance. To create such an electrically resistive path, a relatively narrow electrical trace 118, composed of a material with appropriate electrically resistive properties is fabricated. In this embodiment, the electrical trace 118 is preferably fabricated from a material such as tantalum, and where the inner leads 64 are fabricated from tantalum, the lead 118 can be simultaneously fabricated by altering the patterning mask that is utilized to create the inner leads 64. Thus, as depicted in FIG. 1, a first end portion of the lead 118 terminates over the via 110, and a second end of the lead 118 terminates under an outer electrical lead 70. When the outer electrical lead 70 is fabricated, an electrical connection between the MR element 48 is established through the resistive lead 118 and via 110 to the S1 shield 30. Where the MR element 48 may have a resistance of approximately 20 ohms, the resistance of the lead 118 is preferably approximately 100 or more times larger, or approximately 2,000 ohms, such that the electrical operation of the read head element is minimally affected by the existing connection of the MR element leads 70 to the S1 shield.

Figure 3:
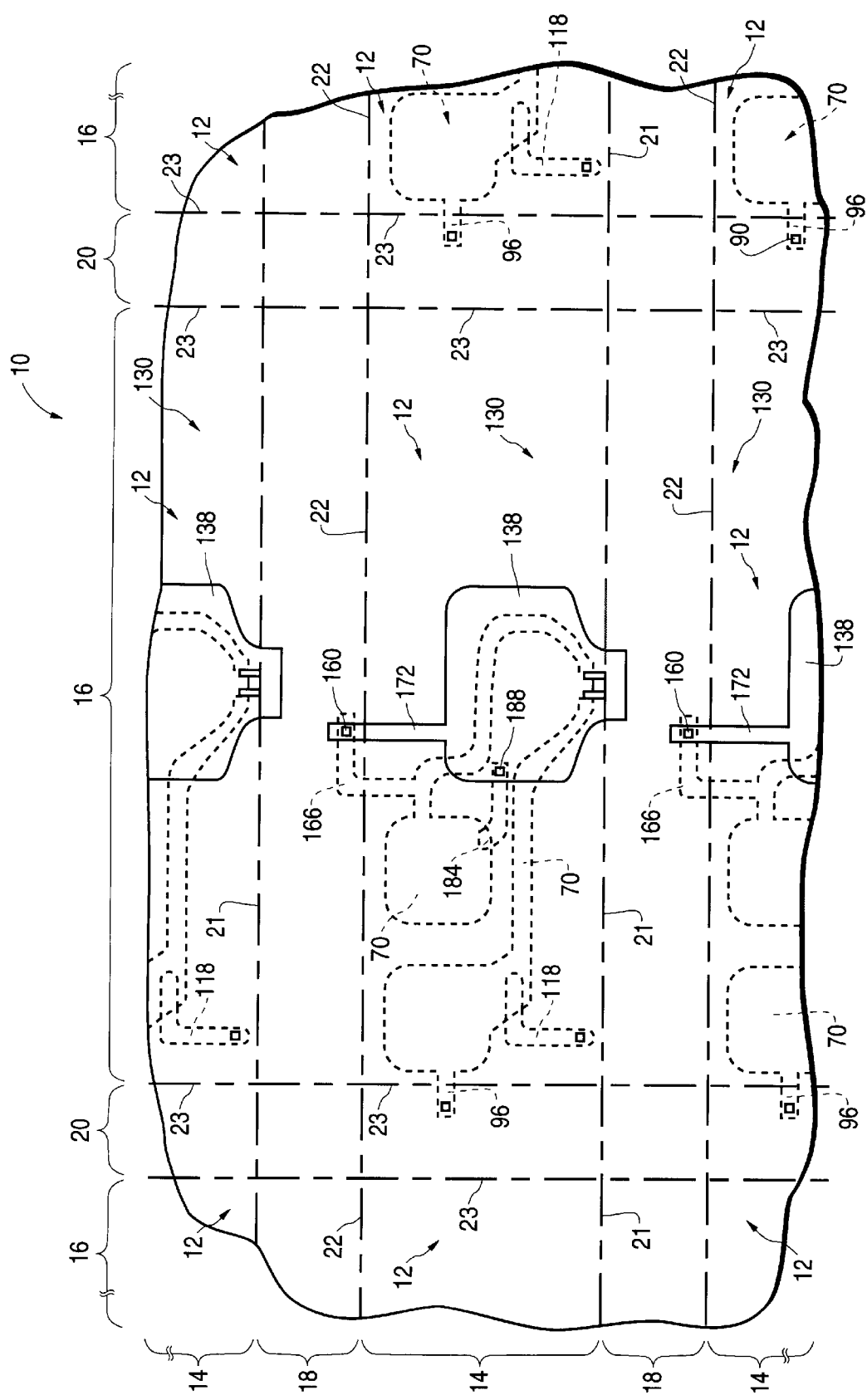
FIG. 3 is a diagramic top plan view, generally depicting a further process stage of a plurality of magnetic heads being fabricated upon a wafer substrate.

A further embodiment of the present invention is next described with the aid of FIGS. 3 and 4, wherein FIG. 3 is a generalized top plan view of a wafer substrate 10 having a plurality of magnetic heads 12 disposed thereon, taken during a point in the magnetic head fabrication process subsequent to the process stage depicted in FIG. 1, and FIG. 4 is a side-sectional view depicting the magnetic head process stage of FIG. 3. As depicted in FIGS. 3 and 4, and described hereabove, the outer electrical leads 70 of the magnetic head have been fabricated. Thereafter, in further read head fabrication steps, a third insulation layer 130 is deposited upon the wafer surface to electrically insulate the leads 70 and MR element 48. The insulation layer 130 is typically composed of alumina. Thereafter, a second magnetic shield 138, typically termed the S2 shield, is fabricated on top of the insulative layer 130. The S2 shield 138 is typically a patterned shield which covers the MR element 48 and does not typically extend to the edges of the magnetic head 12. Increased and/or alternative ESD protection for the MR element 48 is obtained by a resistive electrical connection between the MR element 48 and the S2 shield 138 during manufacturing, and such an electrical interconnection is depicted in FIGS. 3 and 4.

Initially, a via 160 is formed through the insulation layer 130 in the kerf area, which may be kerf 18 at the top of the magnetic head 12 although it may also be kerf 20 at the side of the head 12. To establish an electrical connection through the via 160 to the MR element 48, a resistive electrical lead 166 is fabricated into the kerf area 18 below the location of the via 160. The lead 166 again can be formed by patterning the resistive material of the MR element 48. Additionally, the S2 shield pattern is altered to create an S2 shield extension lead 172 from the S2 shield 138 into the kerf area 18 on top of the via 160. Therefore, it will be understood that the fabrication of this electrical interconnect proceeds with the patterning of the outer electrical leads 70 to connect the electrical lead 166 into the kerf area 18. Thereafter, following the fabrication of the insulation layer 130, the via 160 is fabricated utilizing photolithographic and wet etching techniques, or other techniques as are known to those skilled in the art and described hereabove with regard to the fabrication of the via 90. Thereafter, when the S2 shield 138 is fabricated, the shield extension 172 is likewise fabricated such that the S2 shield material fills the via 160 to establish the electrical interconnection between the S2 shield 138 and the electrical lead 70 of the MR element 48. It is significant to note, as was discussed here above, that the electrical via 160 is fabricated within the kerf area 18, such that the ESD protection afforded by the interconnection of the S2 shield 138 with the MR element 48 exists during the magnetic head fabrication, until the rows of magnetic heads 14 are separated by a saw cut through the kerf area 18, which removes the via 160 and thus terminates the electrical connection. Following the head separation step an edge portion of the lead 166 will be disposed at saw cut side of the head 12.

A permanent electrical interconnection through an appropriate resistive element can be established between the S2 shield and the MR element 48, as has been described here above with regard to resistive element 118 that interconnects the S1 shield and the MR element 48. In particular, as depicted in FIG. 3, an electrically resistive trace 184 can be fabricated such that one end is electrically connected to an MR element electrical lead 70 at a location beneath the S2 shield. A via 188 is formed through the insulation layer 130, and S2 shield material fills the via 188 when the S2 shield is subsequently fabricated. The electrical resistance of the lead trace 184 is made large enough to prevent any significant degradation of the read head operations, as was described here above with regard to resistive electrical trace 118.

A further embodiment of the present invention comprises the electrical interconnection of the S1 shield 30 with the wafer substrate 10, as a further protection against ESD damage to the MR element 48. Specifically, as depicted in FIGS. 1 and 2, a via 194 is fabricated in the first insulation layer 24, prior to the fabrication of the S1 shield 30 thereon. As described above, the via 194 may be fabricated by photolithographic and wet etch techniques, or other techniques as are known to those skilled in the art. Preferably, the via 194 is fabricated in a kerf area of the wafer such as kerf area 20. After the via 194 is formed, the S1 shield 30 is fabricated upon the first insulation layer 24, and S1 shield material thereupon fills the via 194 to establish an electrical connection between the S1 shield 30 and the wafer substrate 10. Thereafter, when the magnetic heads have been fabricated and the wafer is saw cut through the kerf area 20, the electrical connection through the via 194 is thereby severed, and the S1 shield 30 is electrically isolated from the substrate 10 of its magnetic head 12.

It is to be understood that the various ESD protective electrical interconnections described here above can be fabricated individually or in combination. That is, the MR element 48 can be electrically interconnected to the S1 shield 30 (as described hereabove), or to the S2 shield 138 (as described hereabove), or to both of the S1 and S2 shields by utilizing fabrication techniques that combine the shield interconnection steps described hereabove. Additionally, the S1 shield 30 can be electrically interconnected to the substrate 10, such that a device can be fabricated wherein the MR element 48 is protected from electrostatic charge damage by electrical interconnection to both of the S1 shield and the S2 shield and where the S1 shield is further electrically connected to the wafer substrate. The various electrical interconnections are preferably fabricated within the kerf area of the wafer, such that they are severed upon the saw cutting of the wafer following the magnetic head fabrication steps. Alternatively, the electrical connection can be fabricated to remain within the magnetic head where appropriate electrical resistance is established in the electrical leads that connect the shields to the MR element 48.

Figure 5:
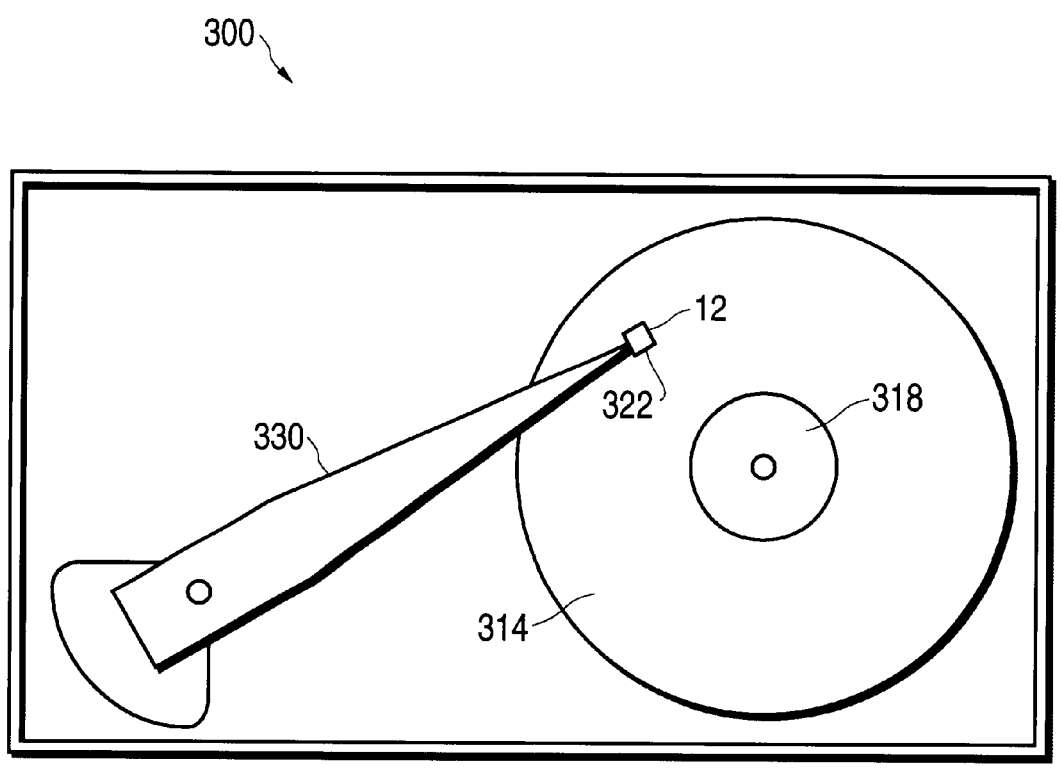
FIG. 5 is a simplified block diagram of a magnetic hard disk storage system embodying the present invention.

A simplified top plan view of a typical hard disk drive 300 which is suitable to include a magnetic head 12 of the present invention is presented in FIG. 5. As depicted therein, at least one hard disk 314 is rotatably mounted upon a motorized spindle 318. A slider 322, having a magnetic head 12 disposed thereon, is mounted upon an actuator arm 330 to fly above the surface of each rotating hard disk 314, as is well known to those skilled in the art. The magnetic heads 12 of the present invention are designed to provide superior performance over prior art magnetic heads in that the MR element 48 of the magnetic heads 12 has been protected from ESD damage during the head manufacturing process. Therefore, a hard disk drive 300 that includes the magnetic head 12 of the present invention will generally be more reliable.

While the invention has been shown and described with regard to certain preferred embodiments, it will be understood by those skilled in the art that various changes in form and detail may be made therein without departing from the spirit, scope and teaching of the invention. Accordingly, the invention herein disclosed is to be considered merely as illustrative, and limited in scope only as specified in the appended claims.

What is claimed is:

1. A method for fabricating a magnetic head, comprising the steps of:

fabricating a first magnetic shield above a surface of a wafer substrate;

fabricating an insulation layer upon said first magnetic shield;

fabricating a magnetoresistive read head element (MR element) upon said insulation layer;

fabricating a first via through said insulation layer to expose a portion of said first magnetic shield, said first via being disposed in a wafer kerf area between adjacent magnetic heads;

fabricating electrical leads for the electrical interconnection of said MR element, portions of said electrical leads being fabricated upon said first via, such that material comprising said electrical leads fills said first via, whereupon electrical interconnection between said MR element and said first magnetic shield is established;

cutting said wafer in said kerf area to separate adjacent magnetic heads, whereby said electrical connection between said MR element and said first magnetic shield is terminated.

2. A method for fabricating a magnetic head as described in claim 1, wherein a portion of said electrical leads is fabricated into said kerf area between said adjacent magnetic heads.

3. A method for fabricating a magnetic head as described in claim 2, wherein a portion of said first magnetic shield is disposed within said kerf area be low said first via.

4. A method for fabricating a magnetic head as described in claim 3, wherein said magnetic head is formed with an ABS side, two lateral sides and a top side, and wherein said first via is formed proximate one of said lateral sides.

5. A method for fabricating a magnetic head as described in claim 3, wherein said magnetic head is formed with an ABS side, two lateral sides and a top side, and wherein said first via is formed proximate said top side.

6. A method for fabricating a magnetic head as described in claim 3, wherein said magnetic head is formed with an ABS side, two lateral sides, and a top side, and wherein said first via is formed proximate said ABS side.

7. A method for fabricating a magnetic head as described in claim 1, comprising the further steps of:

fabricating another insulation layer upon said MR element and said electrical leads;

forming a second via through said another insulation layer to expose a portion of said electrical leads, said second via being disposed in a wafer kerf area between adjacent magnetic heads;

forming a second magnetic shield upon said another insulation layer; portions of said second magnetic shield being fabricated above said second via, such that material comprising said second magnetic shield fills said second via, whereby a resistive electrical interconnection is established between said second magnetic shield and said electrical leads.

8. A method for fabricating a magnetic head as described in claim 7, wherein a portion of said electrical leads is fabricated into said kerf area between said adjacent magnetic heads under said second via.

9. A method for fabricating a magnetic head as described in claim 8, wherein said magnetic head is formed with an ABS side, two lateral sides and a top side, and wherein said second via is formed proximate one of said lateral sides.

10. A method for fabricating a magnetic head as described in claim 8, wherein said magnetic head is formed with an ABS side, two lateral sides and a top side, and wherein said second via is formed proximate said top side.

11. A method for fabricating a magnetic head as described in claim 8, wherein said magnetic head is formed with an ABS side, two lateral sides, and a top side, and wherein said second via is formed proximate said ABS side.

12. A method for fabricating a magnetic head as described in claim 8, comprising the further steps of forming an initial insulation layer between said wafer substrate surface and said first magnetic shield;

forming a third via through said initial insulation layer prior to the fabrication of said first magnetic shield, said third via being disposed in a wafer kerf area between adjacent magnetic heads;

fabricating said first magnetic shield upon said initial insulation layer such that portions of the material comprising said first magnetic shield fills said third via, whereupon an electrical connection is formed between said first magnetic shield and said wafer substrate.

13. A method for fabricating a magnetic head as described in claim 12, wherein said magnetic head is formed with an ABS side, two lateral sides and a top side, and wherein said third via is formed proximate one of said lateral sides.

14. A method for fabricating a magnetic head as described in claim 12, wherein said magnetic head is formed with an ABS side, two lateral sides and a top side, and wherein said third via is formed proximate said top side.

15. A method for fabricating a magnetic head as described in claim 12, wherein said magnetic head is formed with an ABS side, two lateral sides, and a top side, and wherein said third via is formed proximate said ABS side.

16. A method for fabricating a magnetic head as described in claim 1, comprising the further steps of forming a second via through said first insulation layer prior to the fabrication of said first magnetic shield thereon, said second via being disposed in a wafer kerf area between adjacent magnetic heads;

fabricating said first magnetic shield such that portions of the material comprising said first magnetic shield fills said second via, whereupon an electrical connection is formed between said first magnetic shield and said wafer substrate.

17. A method for fabricating a magnetic head as described in claim 16, wherein a portion of said first magnetic shield is disposed within said kerf area above said via.

18. A method for fabricating a magnetic head as described in claim 17, wherein said magnetic head is formed with an ABS side, two lateral sides and a top side, and wherein said second via is formed proximate one of said lateral sides.

19. A method for fabricating a magnetic head as described in claim 17, wherein said magnetic head is formed with an ABS side, two lateral sides and a top side, and wherein said second via is formed proximate said top side.

20. A method for fabricating a magnetic head as described in claim 17, wherein said magnetic head is formed with an ABS side, two lateral sides, and a top side, and wherein said second via is formed proximate said ABS side.

* * * * *